United States Patent
Miles et al.

(10) Patent No.: US 8,446,112 B2
(45) Date of Patent: May 21, 2013

(54) MAGNETICALLY POWERED RECIPROCATING ENGINE AND ELECTROMAGNET CONTROL SYSTEM

(75) Inventors: Stephen Miles, Palm City, FL (US); Michael Cristoforo, Palm City, FL (US)

(73) Assignee: Magnetic Miles, LLC, Palm City, FL (US)

( * ) Notice: Subject to any disclaimer, the term of this patent is extended or adjusted under 35 U.S.C. 154(b) by 0 days.

(21) Appl. No.: 13/454,839

(22) Filed: Apr. 24, 2012

(65) Prior Publication Data
US 2012/0262094 A1    Oct. 18, 2012

Related U.S. Application Data

(63) Continuation of application No. 12/701,781, filed on Feb. 8, 2010, now Pat. No. 8,188,690.

(51) Int. Cl.
| | |
|---|---|
| H02K 33/00 | (2006.01) |
| H02K 33/10 | (2006.01) |
| H02K 7/065 | (2006.01) |
| H02K 41/03 | (2006.01) |

(52) U.S. Cl.
CPC ............. *H02K 33/00* (2013.01); *H02K 33/10* (2013.01); *H02K 7/065* (2013.01); *H02K 41/03* (2013.01)
USPC ................ 318/129; 318/128; 318/37; 318/38

(58) Field of Classification Search
CPC ......... H02K 33/00; H02K 33/10; H02K 7/065; H02K 41/03
USPC ..................... 318/129, 128, 37, 38; 200/237, 200/502; 307/11, 43
See application file for complete search history.

(56) References Cited

U.S. PATENT DOCUMENTS

| 514,169 A | 2/1894 | Tesla |
|---|---|---|
| 2,296,554 A | 8/1940 | Hinchman |
| 3,939,367 A | 2/1976 | Ramirez |
| 3,949,249 A | 4/1976 | Wiseley et al. |
| 4,093,880 A | 6/1978 | Teal |
| 4,228,373 A | 10/1980 | Funderburg |
| 4,317,058 A | 2/1982 | Blalock |
| 4,510,420 A | 4/1985 | Sasso |
| 4,523,114 A | 6/1985 | Smith |
| 4,631,455 A | 12/1986 | Taishoff |
| 4,749,893 A | 6/1988 | Reynolds |
| 5,213,080 A * | 5/1993 | Lambert et al. .......... 123/406.65 |
| 5,219,034 A | 6/1993 | Wortham |

(Continued)

FOREIGN PATENT DOCUMENTS
DE    102006009259    8/2007

*Primary Examiner* — Walter Benson
*Assistant Examiner* — David Luo
(74) *Attorney, Agent, or Firm* — McHale & Slavin, P.A.

(57) ABSTRACT

The instant invention provides a magnetically controlled reciprocating engine having a unique electromagnet control system. The engine is constructed and arranged to operate from a stored power source such as batteries to provide extended run times by controlling the power supplied to the electromagnets in a manner that controls heat generation within the electromagnetic coils, thereby increasing coil life. The control system is also capable of controlling engine speed and/or torque outputs to make the engine versatile for a wide variety of uses. The system is constructed and arranged to be utilized on new or pre-existing engines of various configurations and may be utilized in other industries or devices that benefit from the use of electromagnets.

18 Claims, 12 Drawing Sheets

U.S. PATENT DOCUMENTS

| | | | |
|---|---|---|---|
| 5,457,349 A | 10/1995 | Gifford | |
| 5,469,004 A | 11/1995 | Jachim | |
| 5,592,036 A | 1/1997 | Pino | |
| 5,637,936 A | 6/1997 | Meador | |
| 6,049,146 A | 4/2000 | Takara | |
| 6,220,904 B1 * | 4/2001 | Hoshiba et al. | 440/1 |
| 6,278,204 B1 | 8/2001 | Frenette | |
| 6,552,450 B2 | 4/2003 | Harty et al. | |
| 6,804,997 B1 * | 10/2004 | Schwulst | 73/114.37 |
| 7,105,958 B1 | 9/2006 | Elmaleh | |
| 7,276,822 B2 | 10/2007 | Chen | |
| 7,330,094 B2 | 2/2008 | McCarthy | |
| 7,446,440 B2 | 11/2008 | Mihajlovic | |
| 7,501,725 B2 | 3/2009 | Parker | |
| 7,622,814 B2 | 11/2009 | Hyde et al. | |
| 2002/0121815 A1 | 9/2002 | Sullivan | |
| 2006/0220599 A1 | 10/2006 | Siegler et al. | |
| 2008/0012432 A1 | 1/2008 | Togare | |
| 2008/0122299 A1 | 5/2008 | Cristoforo et al. | |
| 2009/0243519 A1 | 10/2009 | Izumi et al. | |

* cited by examiner

MAGNETICALLY POWERED RECIPROCATING ENGINE AND ELECTROMAGNET CONTROL SYSTEM

CROSS REFERENCE TO RELATED APPLICATIONS

This application is a continuation of U.S. patent application Ser. No. 12/701,781, filed Feb. 8, 2010, now U.S. Pat. No. 8,188,690 entitled, "Magnetically Powered Reciprocating Engine And Electromagnet Control System", the contents of which are incorporated herein in their entirety.

FIELD OF THE INVENTION

This invention relates generally to reciprocating engines. More specifically, the invention is a magnetically powered reciprocating engine and electromagnet control system adaptable for use wherever internal combustion engines are utilized.

BACKGROUND OF THE INVENTION

Reciprocating internal combustion engines, e.g. Otto and Diesel cycle engines are a major factor in just about every aspect of life here and abroad. Reciprocating internal combustion engines facilitate our way of life by providing us with transportation, consumer products, safety, medical assistance, and power generation to name only a few. However, reciprocating internal combustion engines suffer from disadvantages, many of which would no longer be acceptable if there were an alternative to the use of these engines. They require fossil fuel, and suffer from many inefficiencies that cause them to generate heat, noise, vibration and toxic by-products; all of which we tolerate only because we have no economically suitable alternatives. With the decline in the supply of fossil fuels and the increase in harmful atmospheric gasses, governments have a renewed interest in finding alternatives to internal combustion.

For example, some of the energy wasting features of internal combustion engines include friction, inefficient combustion, heat loss from the combustion chamber, aerodynamic drag of air moving through the engine, energy used by ancillary equipment like oil and water pumps, and imperfect valve timing. Another issue that affects the efficiency of these engines is that they must be designed to reduce emissions requiring compromises in design. As a result, the average engine is about 35% efficient and must be kept idling at stoplights, wasting an additional 17% of the energy, resulting in an overall efficiency of about 18%. This means that about 82% of the energy we put into our vehicles in the form of fossil fuels is wasted exiting the engine in the form of non-useful byproducts.

Attempts at eliminating the need for fossil fuels in reciprocating engines has been attempted for decades. Various types of alternative fuels and engine configurations have been suggested, some with more success than others, but overall most have met with very limited success. One such alternative is bio fuels. Bio fuels may be derived from plant materials such as corn or sugar cane. However, these fuels require agricultural land, tractors for planting and harvesting, and distilleries for converting the biomass into fuel. Bio fuels derived from algae, trash, or agricultural waste or other sources could help because they do not require agricultural land use but always seem to be several years away from large scale commercial development. Even if these fuels were developed on a scale suitable for use, there is no suitable system for distributing the fuel to the general public. The distribution system would require several more years for development. Therefore, most scientists agree that if we really want to develop biomass into energy, we should turn it into electricity and not automotive fuel.

Another category of alternative designs relies on electricity and/or magnets to cause reciprocation of or movement of a piston(s). For example, U.S. Pat. No. 2,296,554 issued to A. K. Hinchman. Hinchman's invention relates to a self-timing piston electric engine setting forth a cylinder which includes primary and secondary electromagnetic coils acting upon the piston to cause it to reciprocate. The coils are energized at proper periods by relay timers controlled or actuated by the movements of the piston.

U.S. Pat. No. 3,939,367 issued to Ramirez discloses a permanent magnet and electromagnet actuated mechanical unit that may be secured to an engine block assembly to actuate at least one piston, connecting rod and driveshaft that forms a part of the assembly to obtain rotary power.

U.S. Pat. No. 4,317,058 issued to Blalock, discloses an electromagnetic reciprocating engine. The electromagnetic engine replaces the cylinders with non-ferromagnetic material and the pistons are replaced with permanent magnets. The cylinder heads are replaced with electromagnets.

A shortcoming associated with all of the known prior art relates to the operation of the electromagnets. To make an engine suitable for use in applications such as an automobile requires fairly large electromagnets. Large electromagnets require a supply of high amperage and/or voltage electricity which must be rapidly turned on and off to simulate the firing of pistons in a reciprocating engine. This causes several problems, such as arcing between the contacts, and results in pre-mature failure. In addition, electromagnets operating at high current loads for extended periods of time generate a considerable amount of heat. The increase in heat significantly reduces efficiency and often results in failure of the electromagnetic coil. In addition, the magnetic fields generated by the electromagnets often cause problems such as cascading avalanche breakdown, induced EMF, spikes and voltage clips in other engine systems, such as the timing system.

Thus what is needed in the art is a magnetically operated reciprocating engine having a control system that addresses the problems associated with the prior art. The magnetically operated engine should be reliable and economical to produce. The magnetically operated engine should be constructed and arranged to operate from battery power. The magnetically operated engine should include a control system that provides extended run times by controlling the power supplied to the electromagnets in a fashion that controls heat generation for reliable coil life and efficient operation. The system utilized to control the operation of the electromagnets should also be capable of controlling engine speed and/or torque outputs. The control system should reduce or eliminate the problems often associated with large magnetic fields without compromising performance of the engine.

SUMMARY OF THE INVENTION

The instant invention provides a magnetically controlled reciprocating engine having a unique electromagnet control system for operation and control of the engine. The engine is constructed and arranged to operate from stored power sources, such as batteries, to provide extended run times by controlling the power supplied to the electromagnets in a manner that regulates heat generation within the electromagnetic coils without sacrificing magnetic flux. The control system is also capable of controlling engine speed and/or torque outputs to make the engine versatile for a wide variety of applications. The electromagnetic control system and magnetic components are constructed and arranged for utilization on new or pre-existing engines and may be utilized in other industries or devices that benefit from the use of electromagnets.

In general, an internal combustion reciprocating type engine is utilized by removing the cylinder heads and replacing them with electromagnetic coils. The piston(s) are modified to retain at least one and more, preferably a plurality, of permanent magnets. The standard timing system is also removed and is replaced with a fiber optic system which communicates with a high voltage DC switching mechanism for controlling the flow of power to the electromagnets in a manner that isolates the timing system from the magnetic impulses generated by the engine. In a preferred embodiment, power is supplied to the electromagnets via a series of electrical pulses that vary in duration to minimize power consumption and maximize the magnetic flux developed by the electromagnets. The power pulses facilitate delivery of different electrical pulses, thus magnetic flux, based on crankshaft angle to maximize torque delivery provided by the engine. The cooling system, if present, can also be removed, as well as the fuel delivery system.

Accordingly, it is an objective of the present invention to provide a magnetically operated reciprocating piston engine.

It is another objective of the present invention to provide a control system for electromagnets that is particularly suited for reciprocating piston engines.

It is yet another objective of the present invention to provide a magnetically operated engine that utilizes a combination of permanent and electromagnets.

It is still yet another objective of the present invention to provide an electromagnet control system that controls heat build-up within the electromagnets.

It is a further objective of the present invention to provide an electromagnet control system that provides at least one pulsed electric signal to each electromagnet during each firing window.

It is yet a further objective of the present invention to provide an electromagnet control system that provides two different pulsed signals to each electromagnet during each firing window.

It is still yet a further objective of the present invention to provide an electromagnet control system that provides variably pulsed electrical power to electromagnets based on crankshaft angle to maximize torque produced by the engine.

It is an even further objective of the present invention to provide an electromagnet construction having a unique core material.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
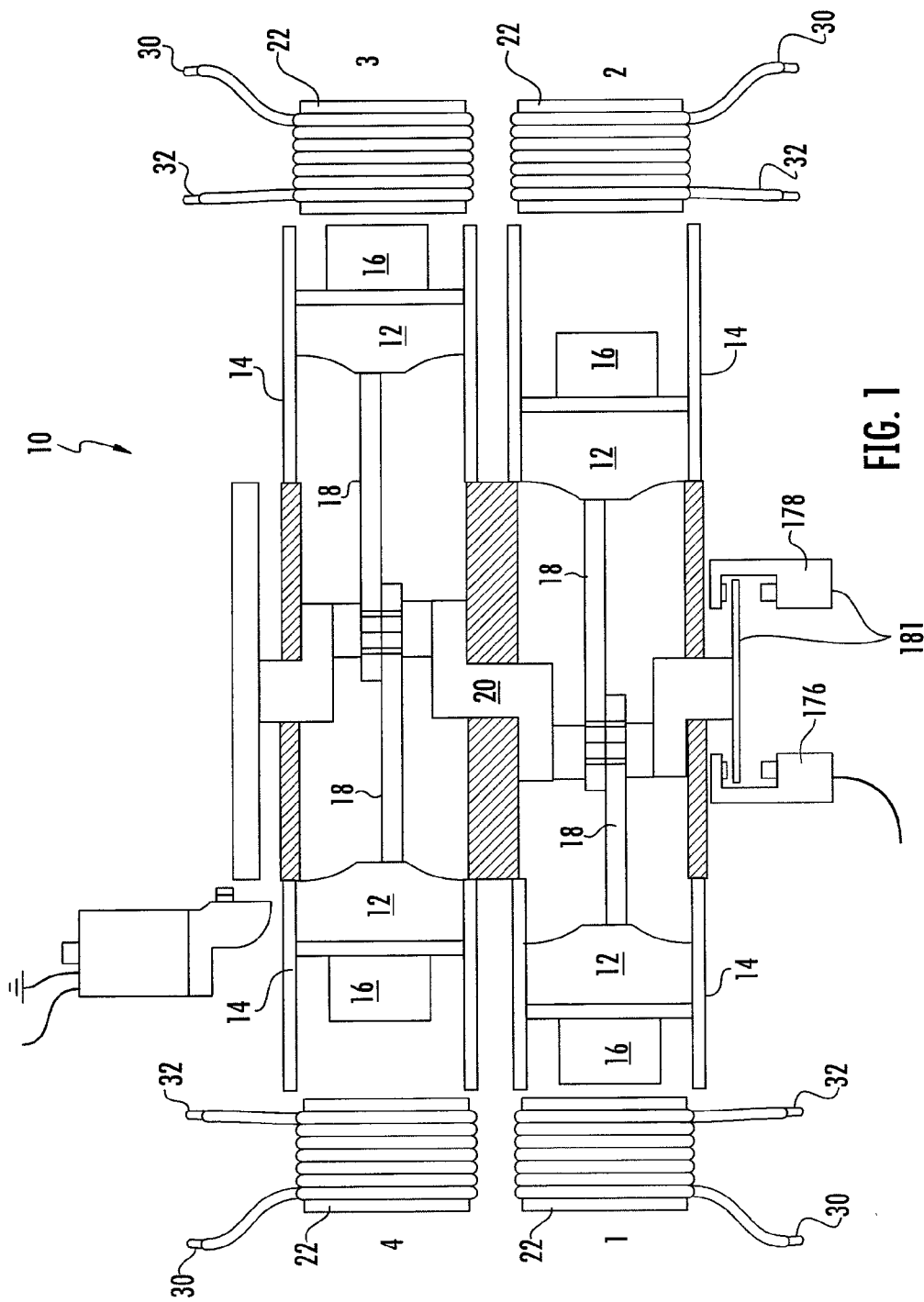
FIG. 1 is a top view partially in section illustrating one embodiment of the present invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
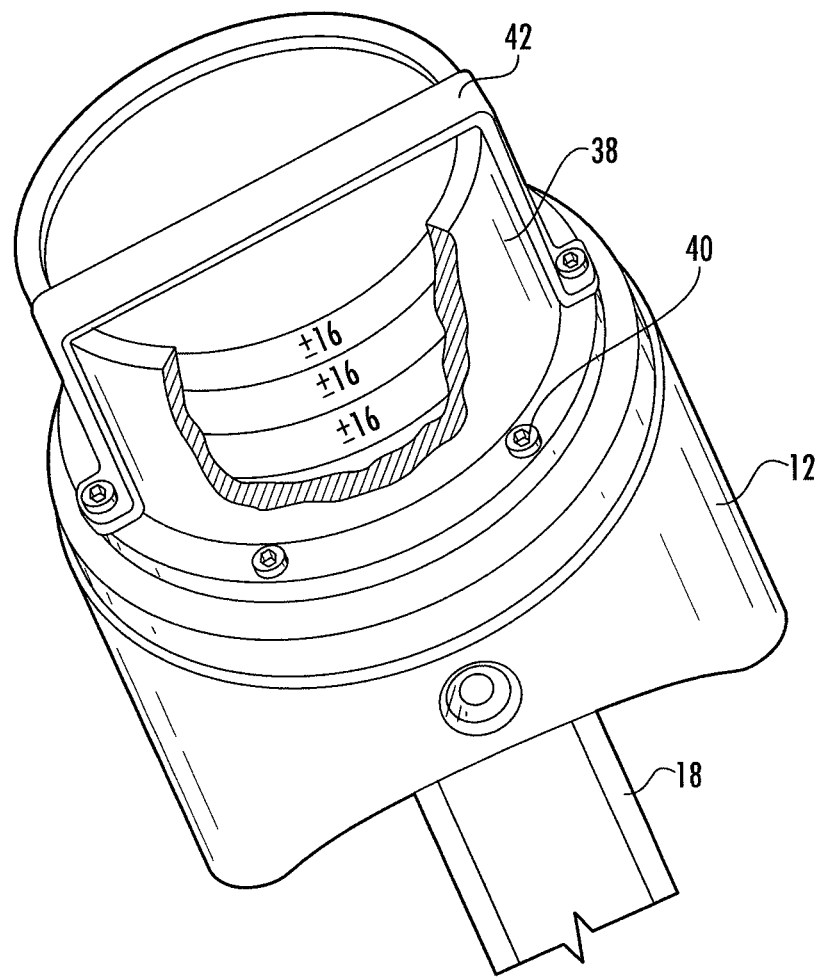
FIG. 2 is a top perspective view partially in section illustrating a piston assembly of the present invention.

Referring to FIGS. 1 and 2, a magnetically operated reciprocating engine 10 is illustrated. The magnetically operated reciprocating engine 10 includes at least one piston 12 constructed and arranged to reciprocate along a substantially linear path illustrated herein as a cylinder 14. The piston 12 includes at least one, and preferably a plurality of permanent magnets 16 secured thereto. The magnets are preferably secured to a top surface of the piston 12 via a non-metallic sleeve 38. The sleeve may be secured to the top surface of the piston with fasteners 40, and a strap member 42 may extend over the magnets to further secure the position of the magnets. The piston 12 is pivotally secured to a connecting rod 18 that is rotationally connected to a crankshaft 20 to convert the reciprocating movement of the piston into rotary motion at the crankshaft. An electromagnet assembly 22 is secured beyond the end of the piston 12 stroke at a position to react with the permanent piston magnets 16 when energized in a controlled manner. A timing/firing system is utilized to monitor rotation of the crankshaft for causing the electromagnet assembly 22 to generate a magnetic field in response to crankshaft position. The electromagnet assembly 22 and permanent magnets 16 are preferably configured so that a pushing force is created between the coil banks and the pistons. In an alternative embodiment one bank may be electromagnetically pushing while the opposite bank is electromagnetically pulling. It should be noted that while a horizontally opposed engine is illustrated, the instant invention can be utilized on any reciprocating engine configuration known in the art without departing from the scope of the invention. Such engine configurations include, but should not be limited to, V-configurations, W-configurations, in line configurations, radial configurations and the like.

Figure 3:
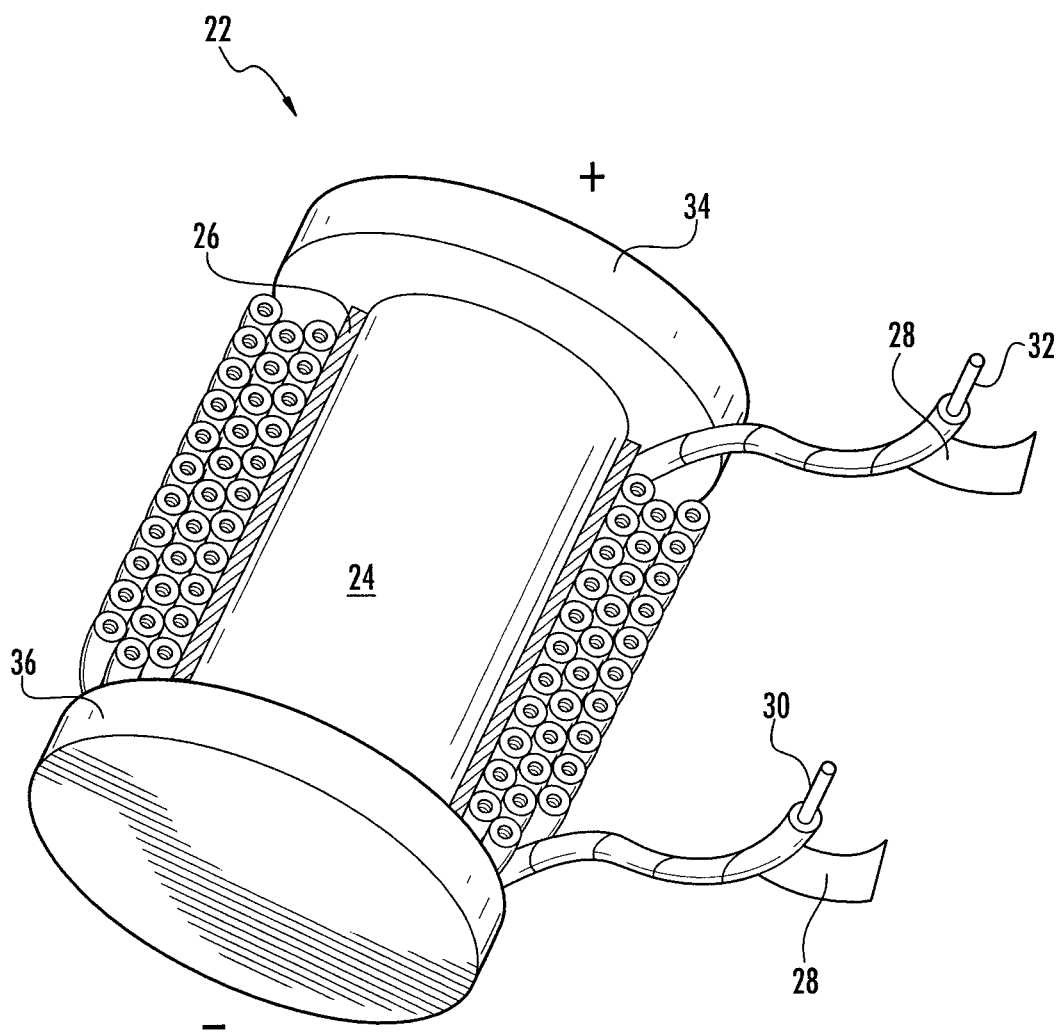
FIG. 3 is a perspective view illustrating one embodiment of a coil assembly of the present invention.
Figure 4:
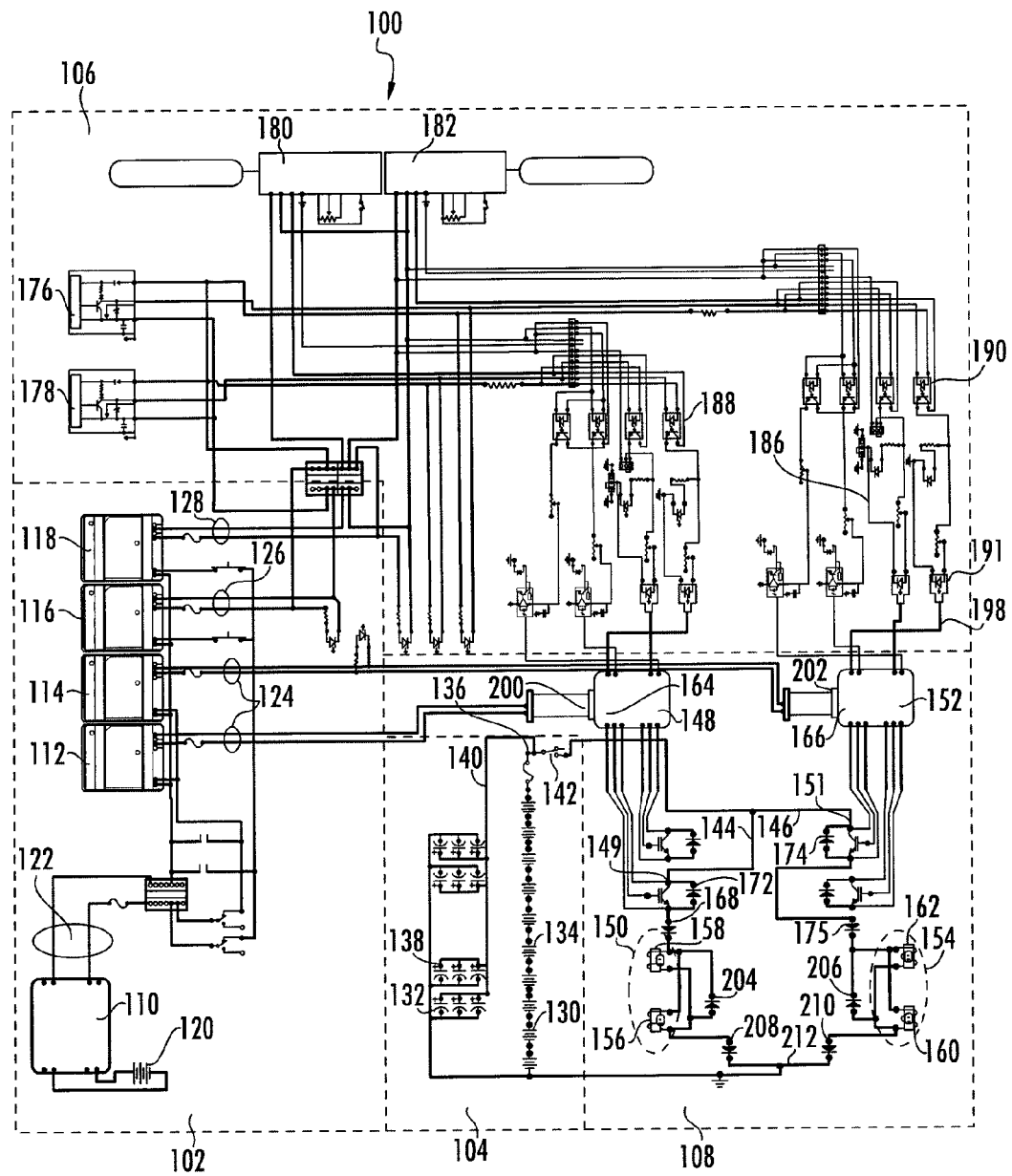
FIG. 4 is an electrical schematic of one embodiment of the present invention.
Figure 5:
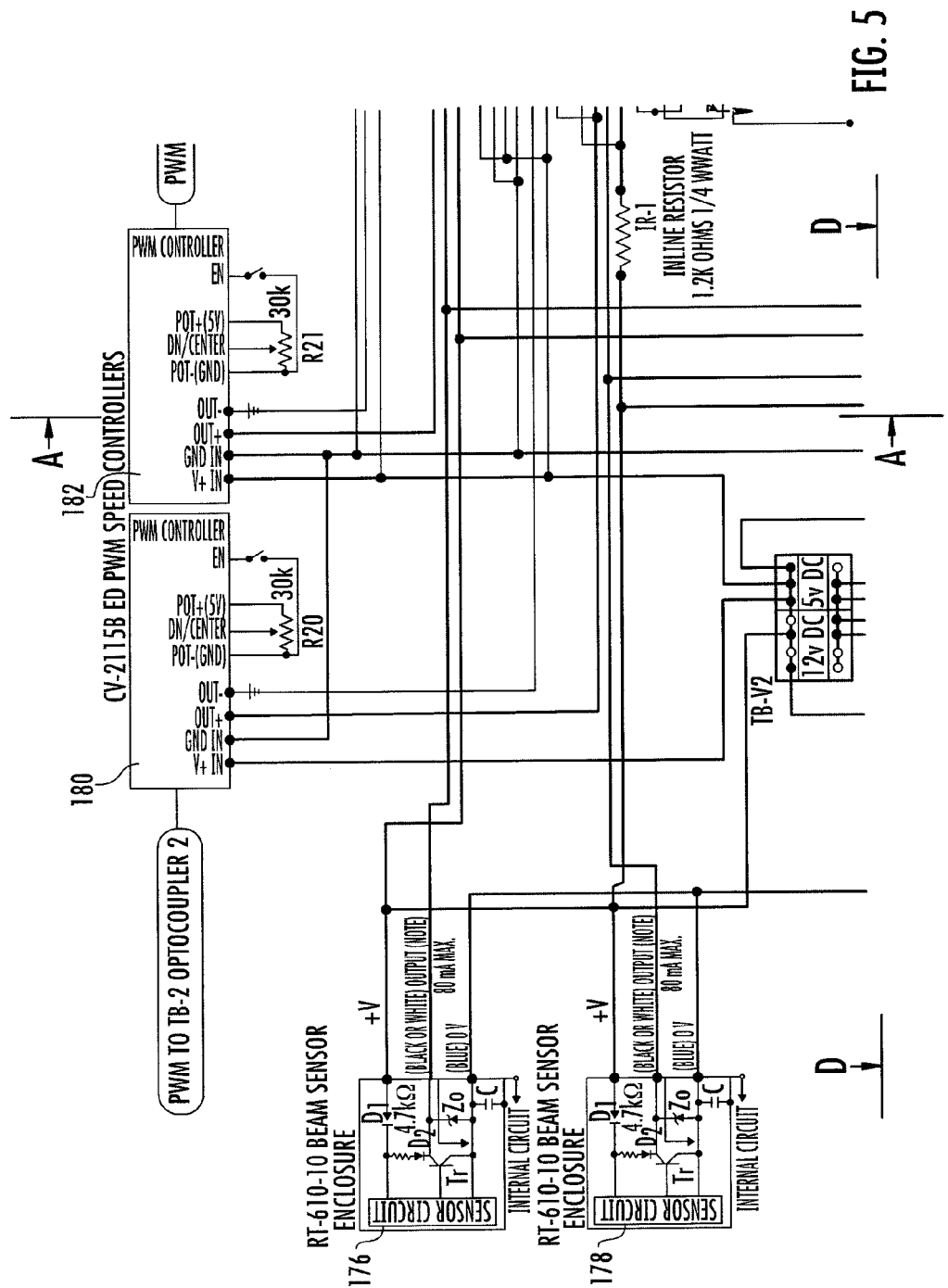
FIG. 5 is a partial view of the schematic illustrated in FIG. 4.
Figure 6:
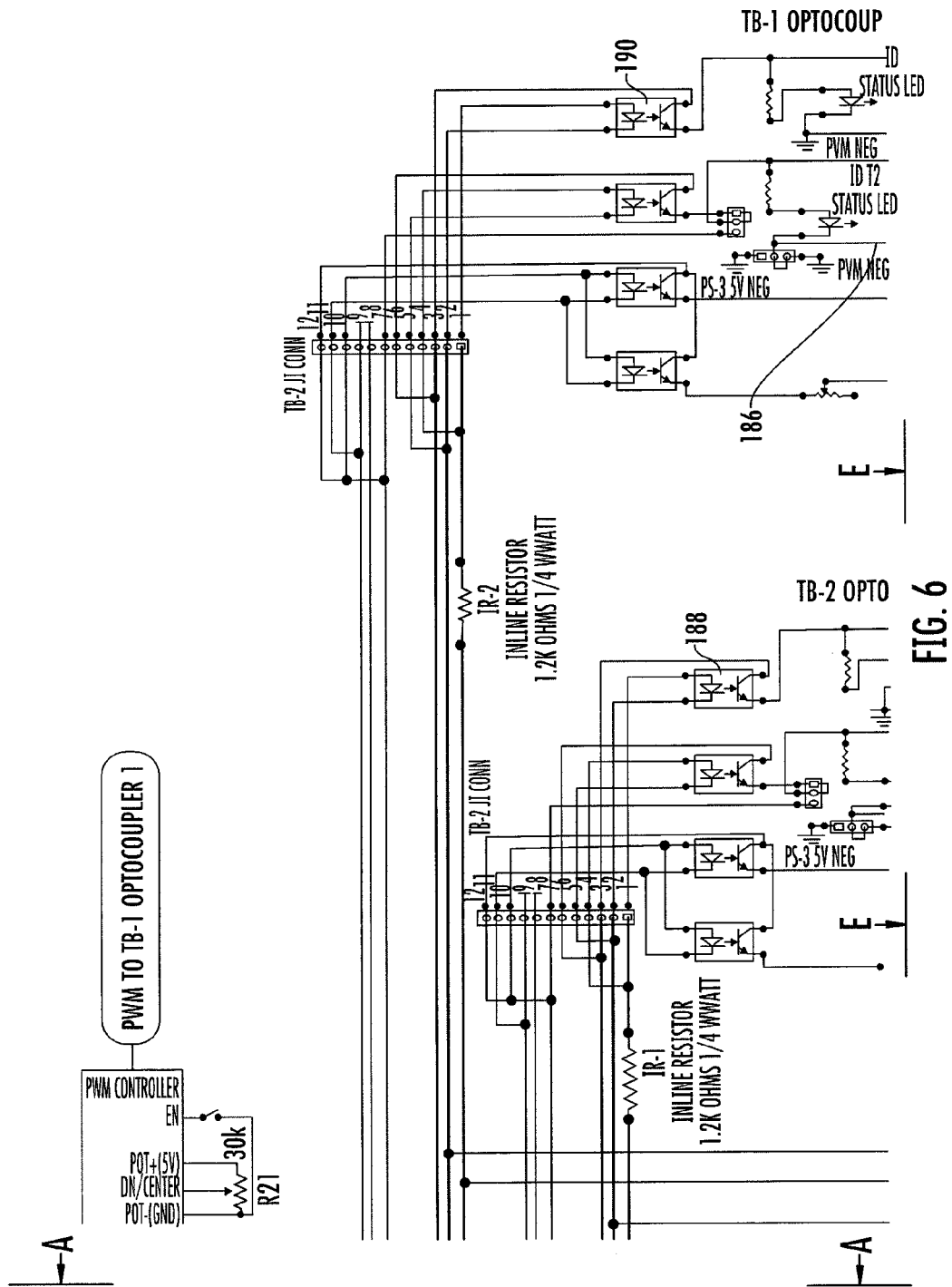
FIG. 6 is a partial view of the schematic illustrated in FIG. 4.
Figure 7:
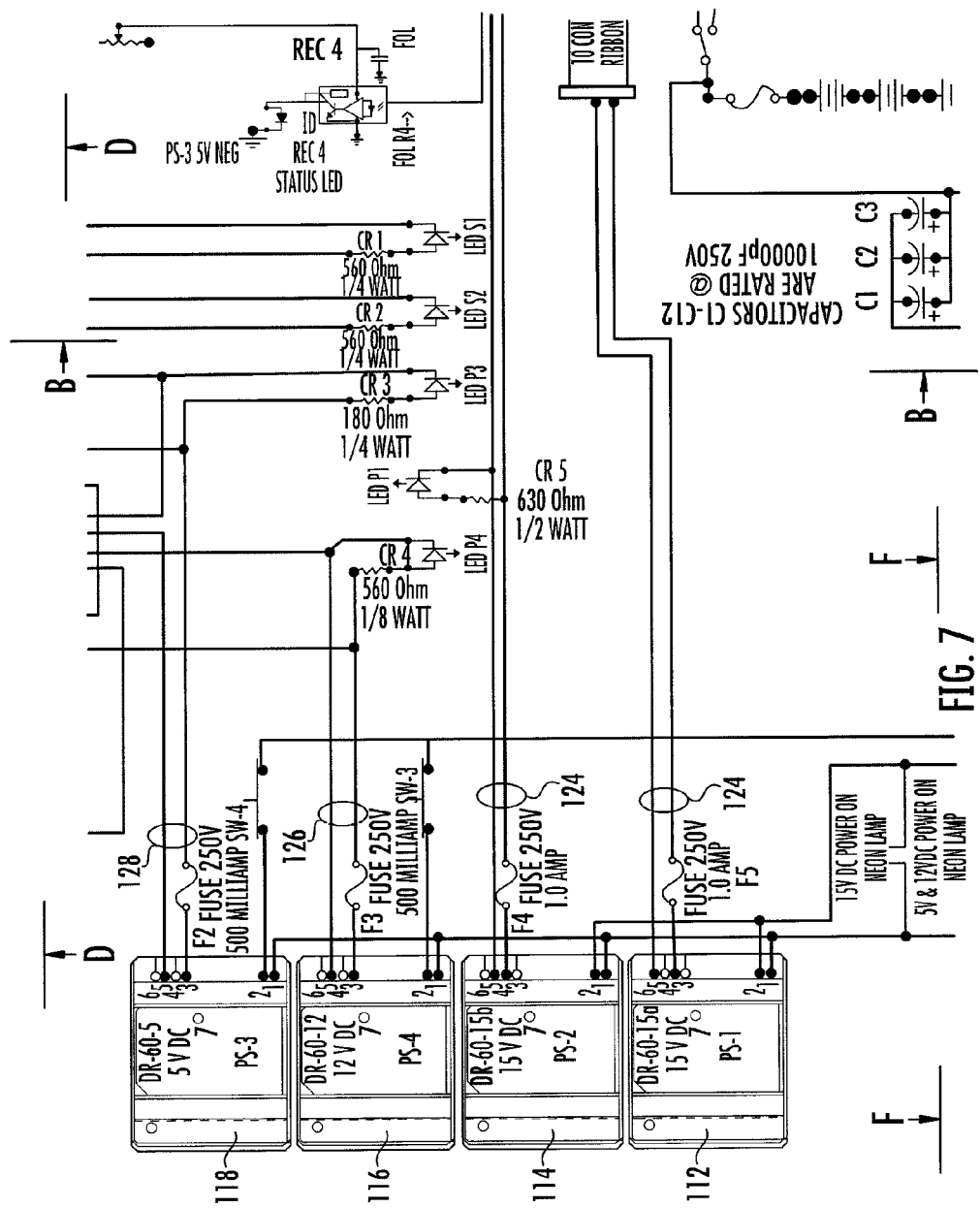
FIG. 7 is a partial view of the schematic illustrated in FIG. 4.
Figure 8:
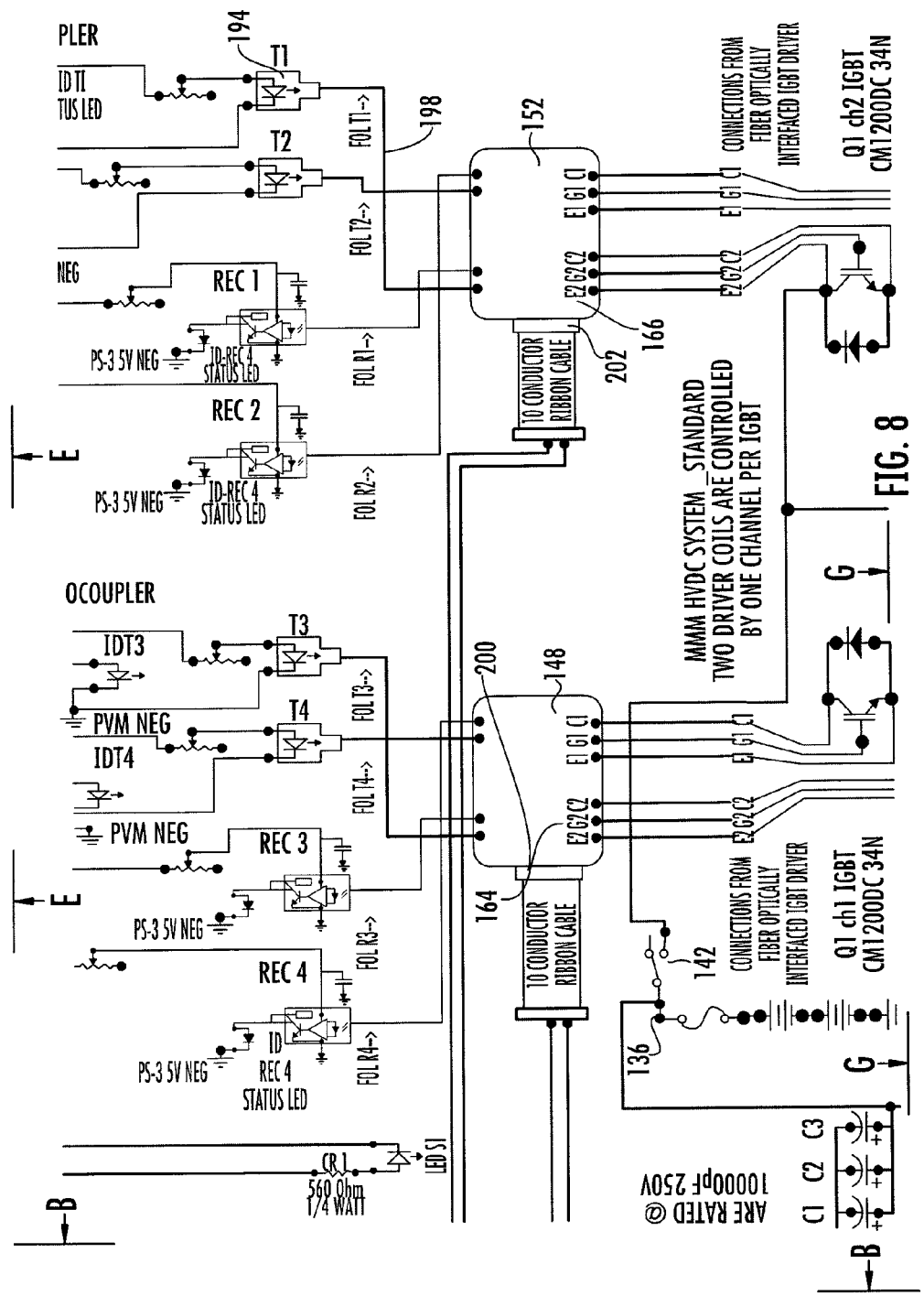
FIG. 8 is a partial view of the schematic illustrated in FIG. 4.
Figure 9:
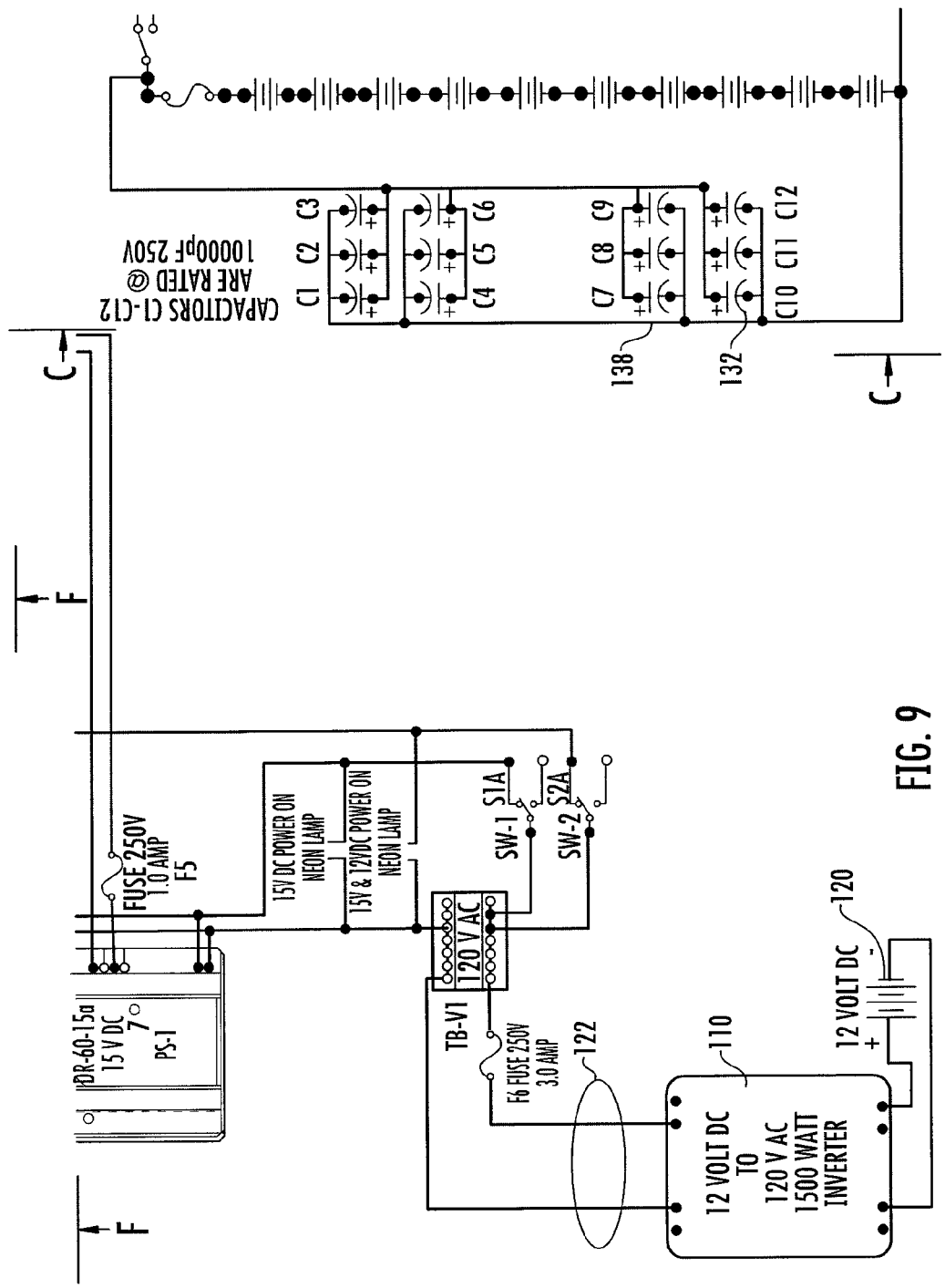
FIG. 9 is a partial view of the schematic illustrated in FIG. 4.
Figure 10:
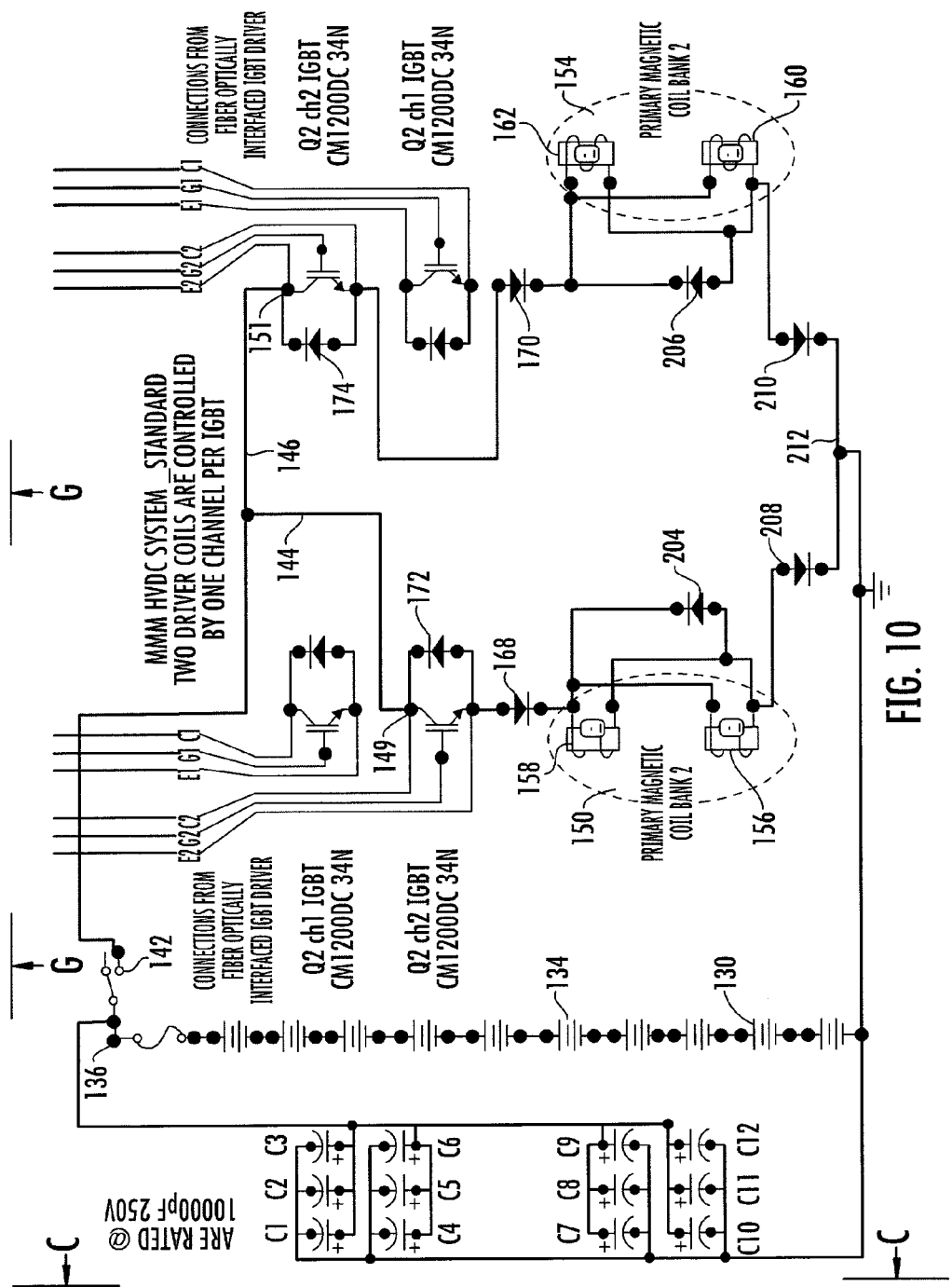
FIG. 10 is a partial view of the schematic illustrated in FIG. 4.

Referring to FIG. 3, a partial section view of an electromagnetic coil 22 is illustrated. The coil includes a central spool 24 having a pair of end caps 34, 36; all constructed of a ferromagnetic material suitable for creating a magnetic field.

The end caps 34, 36 generally provide a barrier to prevent movement of the wire coil with respect to the core during operation. In a most preferred embodiment, the core is constructed of a material with high magnetic permeability and low coercivity and magnetostriction resulting in low hysteresis loss. In a most preferred embodiment, the core material is a nickel-iron alloy (approximately 80% nickel, 15% iron plus copper, silicone and molybdenum). The core material should be annealed in a magnetic field having a hydrogen atmosphere. The annealing alters the material's crystal structure, aligning the grains and removing some impurities, especially carbon which obstructs the free motion of the magnetic grain boundaries. A suitable core material may be purchased under the name MU-SHIELD available from the MuShield Company Inc. of Londonderry, N.H. Wrapped around the core is a barrier layer 26 of DuPont KAPTON insulation. A plurality of wire wraps 28 extend around the core to create the electrical field. In the preferred non-limiting embodiment about 250 wraps of 8 gauge copper wire wrapped in KAPTON tape 28 insulation are provided. The distal ends 30 and 32 of the coil wire extend outwardly from the coil for attachment to the timing/firing system. It should be noted that providing more wraps of wire will provide a larger magnetic field when energized and less wraps will provide a smaller magnetic field as is known in the art.

Referring to FIGS. 4-10, a wiring diagram showing one embodiment of the timing/firing system 100 is illustrated. The timing/firing system generally includes a low voltage power supply module 102, a high voltage supply module 104, a timing module 106, and a firing module 108. The low voltage power supply module 102 is comprised of a power inverter 110 and a plurality of power supplies 112, 114, 116, 118 having various output voltages for operation of the electronic components that make up the timing and firing modules 106, 108 respectively. The power inverter 110 preferably converts a 12V DC 120 supply of power to 120V AC 122, filtering and conditioning the 12V DC power to have a sine wave form. The converted power 122 is preferably supplied to four power supplies: a first 112 and a second 114 converting the 120V AC power 122 to 15V DC 124, a third 116 converting the 120V AC power to 12V DC 126, and a fourth 118 that converts 120V AC power to 5V DC 128. Because the high magnetic pulse flux that the timing/firing system is subject to can interfere with signaling and sensing functions, the inverter 110 and power supplies 112-118 redundantly filter and condition the power for supply to the other electronic components. This construction greatly reduces the possibility of transient spike anomalies that could cause premature firings, distorted timing, over currents, over voltage or even avalanche breakdowns that could cause electronic components to fail.

The high voltage system (HVDC) 104 is preferably a plurality of batteries 130 and capacitors 132. In a most preferred embodiment the array of batteries 130 comprises 10 12V DC batteries 134 hooked up in series to provide a total of 120V DC power 136 to the electromagnetic coils. The array of capacitors 132 preferably comprises about 12 10,000 pico-Farad capacitors 138. The capacitors are generally constructed and arranged to smooth the draw on the batteries to provide extended run times, reduce heat build-up in the batteries 134 and provide a smoother power signal to the coils. The positive polarity of the battery array 140 connects to the line side of a single pole single throw switch which acts as the main power switch 142 and can either energize or shut down all of the 120V DC supplied components throughout the HVDC system. From the load side of the main power switch 142 the 120 v DC positive polarity is divided into two separate HVDC supply legs 144, 146. A first leg 144 connects to the collector 149 of the first insulated gate bipolar transistor (IGBT) 148 supplying power to coil bank 1 150, including coils 1 and 4 156, 158, while the second leg 146 connects to the collector 151 of the second IGBT 152 supplying power to coil bank 2 154, including coils 2 and 3 160, 162.

In a preferred embodiment, the first and second IGBTs 148, 152 are MITSUBISHI part no. CM1200DC 34N and are each rated at 1,700 volts 1,200 amps. The first and second IGBTs 148, 152 are configured to include duel switching (two channels) capability and can be operated either independently, in tandem, or in an alternating pattern. When two IGBTs are utilized, Channel 1 164, 166 respectively of each IGBT provides independent switching of the coil banks 1 & 2. It should also be noted that while the preferred embodiment includes two IGBTs, more or less IGBTs may be utilized without departing from the scope of the invention. From the Channel 1 164 emitter of the first IGBT 148 the 120 v DC power passes through blocking diode 168; and from the Channel 1 166 emitter of the second IGBT 152 the 120 v DC power passes through a blocking diode 170. Diodes 168 and 170 are preferably power diodes, VISHAY part no. SDI-IOOC16 B-PUK, rated at 1400 Amp 1600 Volts. Diode 168 is connected to coil bank 1 150, and diode 170 is connected to coil bank 2 154. Diodes 168 and 170 prevent any back EMF caused by a failure in fly-back diodes 172 or 174 from reaching the first or second IGBTs.

Still referring to FIGS. 4-10, the main components of the timing system 106 are two RT-610-10 U-shaped photoelectric infrared sensors 176, 178. The infra-red sensors 176, 178 cooperate with timing disc 181 to provide timing with respect to position of the crankshaft 20, and thus pistons 12 to initiate energizing coil bank 1 150 or coil bank 2 154 and when to shutdown/de-energize coil bank 1 and/or coil bank 2. In this manner the infrared sensors operate to specify duration for independent operation of the coil banks. A low voltage ON or OFF digital signal regarding the specific duration is sent to a respective low voltage power modulator and pulse controller 180, 182. In operation, each photoelectric infrared sensor 176, 178 senses rotation of the timing disc 181 signaling the respective power modulator and pulse controller 180, 182 when to send power to a respective IGBT 148, 152 to energize a respective coil bank 150, 154. The signal is preferably a 12 v DC signal of a specific duration via an EMF shielded cable to the respective true bypass (TB) opto-coupler 184, 186. In a most preferred embodiment, one RT-610-10, one Power Modulator and Pulse Controller and one opto-coupler are provided for each bank of cylinders. Providing independent pulse width modulators (PWM) to TB opto-coupler groups for each coil bank isolates possibility of failures from cascading and increases options for function configurations of the coil banks. Each respective low voltage power modulator and pulse controller 180, 182 functions to interface the timing/firing system 106 with the fiber optically interfaced IGBTs 148, 152. The power modulator and pulse controllers 180, 182 also convert the steady on/off digital signal received from the timing/firing module 106 to a signal that can be manually varied in duty cycle within the signal time frame/duration sent. The purpose is to reduce heat produced by the DC high voltage/amperage supply 104 to the IGBT switching components and the electromagnetic coils in their respective coil bank, to be able to manually vary the revolutions per minute (RPMs) of the motor 10 by reducing the effective voltage supplied to the electromagnetic coils 22 in their respective coil bank and to bring efficiency to the collection of back EMF. This is accomplished via a Pulse Width Modulator within the power modulator and pulse controllers. In operation, when the TB Opto-coupler component 184, 186 receives the shielded 12 v DC ON digital signal from the RT-610-10 U-shaped photoelectric infrared sensor 176, 178 it closes an opto-isolating switch 188, 190. This action allows a pulse width modulated 5 v DC signal mirroring in duration the signal sent by the RT-610-10 photoelectric infrared sensor 176, 178 that is electrically isolated from the RT-610-10 in the Timing/Firing system. Opto-isolating is used to fire-wall one part of the system from another, preventing problems caused by cascading avalanche breakdown, induced EMF, spikes, and voltage clips. The pulse width modulated 5 v DC signal powers a fiber optic transmitter 192, 194 on the TB Opto-coupler, converting the signal from a pulsed width modulated electrical signal to pulsed width modulated laser light signal. The pulsed width modulated laser light ON or OFF digital signal is sent via a fiber optic cable 196, 198 to the fiber optically interfaced IGBT Driver 200, 202 which in turn will open or close the IGBT controlling the high voltage DC power. It should be appreciated that because fiber optics are immune to the high magnetic flux environment, converting the pulsed electrical signal to a laser pulsed signal maintains very low attenuation and high integrity of the signal to maintain the integrity of the signal to eliminate the need for EMF shielding and give greater latitude to the range of pulse width that can be utilized. Thus, much higher pulsing can be employed, allowing system design options regarding back EMF that are excluded by standard hard-wired IGBT drivers.

Referring to the firing system 108, the Fiber Optically Interfaced IGBT Driver is constructed and arranged to control the opening and closing of the IGBT gates, thus switching on or off the HVDC power to the coil banks. Power supplied to the IGBT driver 200, 202 is a filtered and conditioned 15 v DC 0.5 Amp. via shield twisted pair wires 124 extending from power supplies 112, 114. The IGBT Driver 200, 202 is also constructed and arranged to include features that can be incorporated as torque power output IC Controller/Sensors that allow the shift from a push-push system between the electromagnets and the permanent magnets to a system that a pushes on one coil bank while the other coil bank pulls (attracts) thus adding more torque to the power stroke. Shifting from a push-push mode to a push-pull mode may be accomplished on the fly.

High voltage DC switching is accomplished by two high voltage, high amperage insulated gate bipolar transistors (IGBT) 148, 152 and are preferably HVIGBT MODULES MITSUBISHI part no. CM1200DC 34N, each rated at 1700 volts 1200 amps. Each IGBT is controlled by a driver board 200, 202 that is fiber optically interfaced to a respective TB opto-coupler component 184, 186 located in the low voltage power modulator and pulse controller. Each IGBT gates power to a respective coil bank or cylinder independently of other IGBTs being utilized. Each electromagnetic coil bank 150, 154 preferably includes a flyback diode 204, 206 across its positive and negative connection. It has been found that VISHAY part no. SDI500030L B-PUK is rated at 1600 A 3000V diodes, and is suitable to eliminate flyback. Flyback is the sudden voltage spike seen across the inductive load presented by the coil banks when its supply voltage is abruptly changed by the systems pulsing and switching frequency. From each coil bank the high voltage DC continues through another isolation diode 208, 210, preferably VISHAY part no. SD1500030L B-PUK 1600 A 3000V. Isolation diodes 208, 210 are to be considered legacy components; their primary function is to isolate the magnetic coil banks from one another. Isolation diodes 208, 210 connect to a common copper buss 212 which connects to the negative terminal of the high voltage DC 120V Power Supply battery array.

Figure 11:
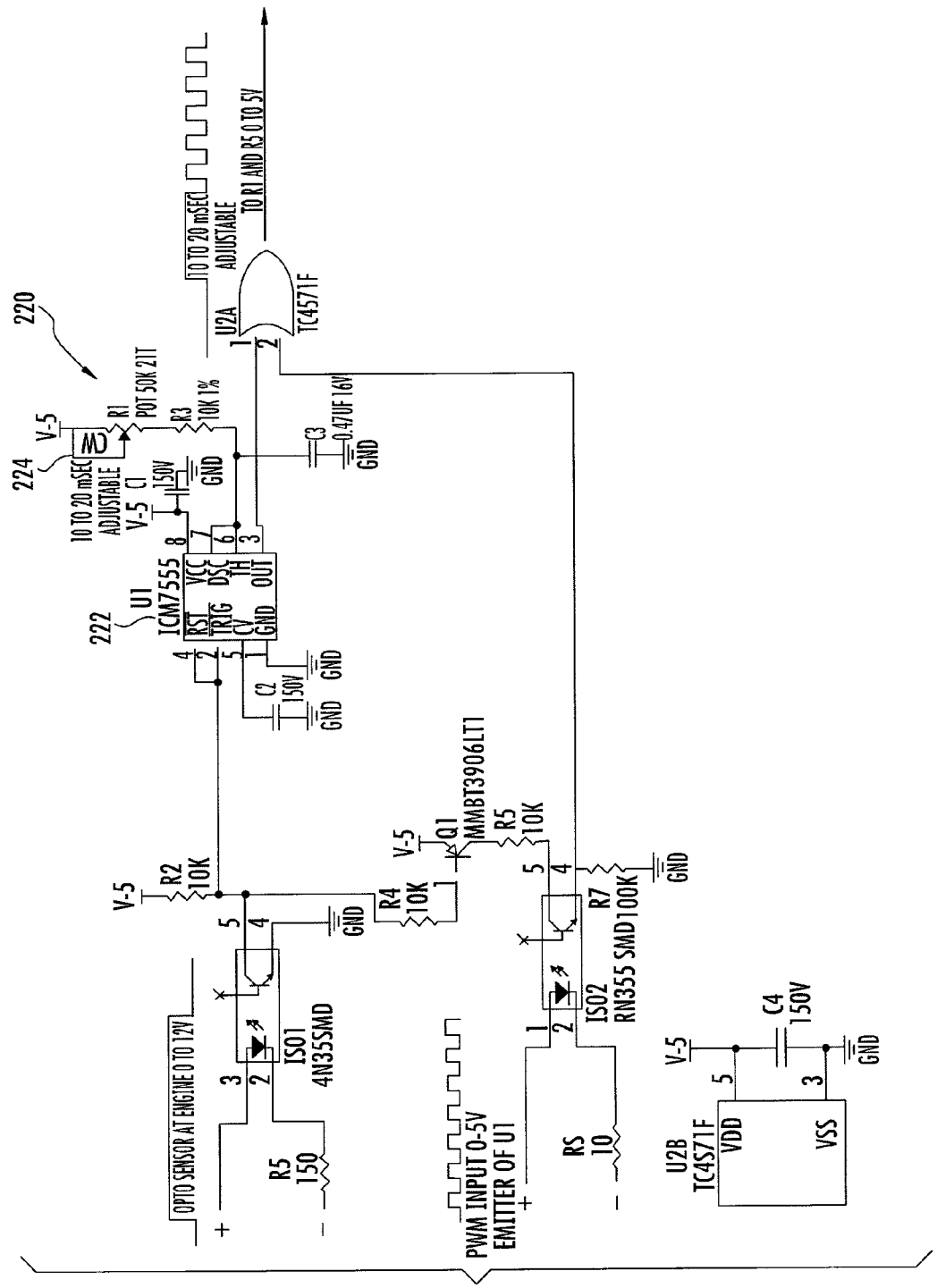
FIG. 11 is an electrical schematic of a power control circuit of one embodiment of the present invention.
Figure 12:
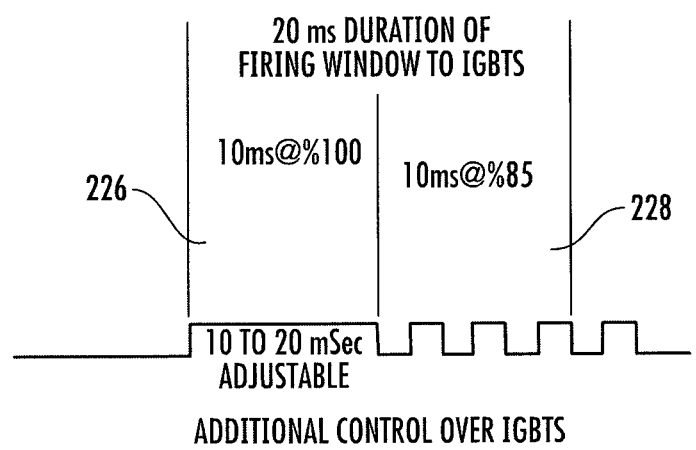
FIG. 12 illustrates one embodiment of the power delivery to the electromagnetic coils when the power control circuit of FIG. 11 is utilized.

Referring to FIGS. 11 and 12, an alternative opto-isolator construction is illustrated. In this embodiment a timer circuit 222 and potentiometer 224 are included. With this arrangement, the firing window of the IGBTs can be broken into more than one pulse signal to allow additional control over the electromagnets and the power supply as illustrated in FIG. 12. This configuration allows an initial electrical impulse 226 followed by a second electrical pulse 228. Those skilled in the art will recognize that this construction allows the duty cycle of the electromagnets to be customized to a particular application. This construction also allows the duty cycle of the electromagnets to be altered based upon inputs from sensors, such as torque sensors, to reduce power consumption based on engine load. Other advantages include control over peak torque produced during the firing window which may include a lower duty cycle during the first portion of the firing window and a higher duty cycle during the second portion of the firing window.

It should be noted that while not illustrated, power generation means well known in the art may be utilized to maintain supply of power in the batteries. Such power generation means may include, but should not be limited to, alternators, generators, magnetos, dynamic braking and the like. The power generation means may be operated directly from the engine by belt, shaft, gears, direct coupling, fluid drive, etc. Alternatively, the power generation means may be indirectly coupled to the engine such as through dynamic braking, wheel generators, and auxiliary internal or external combustion engines such as in a hybrid. It should also be noted that the engine of the present invention may be operated from a conventional power grid in a static setting thereby eliminating the need for the batteries.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A timing/firing system for operation of an electromagnetically controlled reciprocating piston comprising:
   at least one piston constructed and arranged to reciprocate along a substantially linear path having a predetermined length, said at least one piston including at least one permanent magnet secured thereto;
   at least one electromagnet assembly fixedly positioned to cause an axial reaction of said at least one permanent magnet when energized;
   a low voltage power supply, said low voltage power supply having at least one output voltage for operation of electronic components comprising a timing module and a firing module;
   a high voltage direct current power supply;
   a timing module in electrical communication with said low voltage power supply, said timing module constructed and arranged to monitor the movement of said at least one piston with respect to said linear path whereby said timing module generates a light signal in response to said movement, said light signal being transferred to a firing module;
   a firing module in electric communication with said low voltage power supply and said high voltage power supply, said firing module including at least one driver board optically connected to said timing module to receive said light signal from said timing module, said driver board in electrical communication with at least one insulated gate bipolar transistor, said insulated gate bipolar transistor constructed and arranged to control the opening and closing of at least one gate, thus connecting and disconnecting said high voltage direct current power supply to said at least one electromagnet assembly in a predetermined manner.

2. The timing/firing system of claim 1, wherein said predetermined length of said linear path terminates in a top dead center position at one end and a bottom dead center position at a second end, said timing module constructed and arranged to generate said pulsed light signal as said piston approaches said top dead center position and terminate said pulsed light signal after said piston passes said top dead center position and begins traveling toward said bottom dead center position, defining a firing window, whereby said high voltage direct current power supply is connected to said at least one electromagnet assembly in a pulsed manner throughout said firing window.

3. The timing/firing system of claim 2, whereby said high voltage direct current power supply is connected to said at least one electromagnet assembly so that said at least one electromagnet assembly receives a first electrical pulse of a first duration as said piston travels through a first portion of said firing window and said at least one electromagnet assembly receives a second electrical pulse of a second duration as said piston travels through a second portion of said firing window.

4. The timing/firing system of claim 2, whereby said high voltage direct current power supply is connected to said at least one electromagnet assembly so that said pulses vary in duration throughout said firing window.

5. The timing/firing system of claim 1 wherein said at least one insulated gate bipolar transistor includes two switching channels that can be operated either independently, in tandem, or in an alternating pattern.

6. The timing/firing system of claim 1 wherein said timing module includes at least one photoelectric infrared sensor, said at least one infrared sensor being constructed and arranged to cooperate with a timing disc to provide the position of said at least one piston, said photoelectric sensor generating a steady electrical signal for delivery to a power modulator and pulse controller.

7. The timing/firing system for operation of an electromagnet of claim 6 wherein said timing module includes at least one power modulator and pulse controller in electrical communication with said photoelectric infrared sensor, said power modulator and pulse controller constructed and arranged to convert said steady digital signal received from said photoelectric infrared sensor to a signal that can be manually varied in duty cycle within the signal time duration sent.

8. The timing/firing system of claim 1 wherein said high voltage power supply includes about 10 12 Volt batteries attached together in series to provide a total of 120 Volts direct current power.

9. The timing/firing system of claim 8 wherein said high voltage power supply includes a plurality of capacitors connected between said batteries and an electromagnetic coil to smooth the electrical draw from the batteries and provide a smoother power signal to said electromagnetic coil.

10. The timing/firing system for operation of an electromagnet of claim 1 wherein said firing system includes at least one flyback diode electrically connected across a positive and a negative connection of said at least one electromagnet.

11. A magnetically operated reciprocating engine comprising:
   at least one piston constructed and arranged to reciprocate along a substantially linear path, said at least one piston including at least one permanent magnet secured thereto, said at least one piston operatively connected to a crankshaft;
   a crankshaft having at least one offset journal for converting reciprocating movement of said at least one piston into rotary motion;
   at least one electromagnet assembly fixedly positioned on said engine at a position to cause an axial reaction of said at least one permanent magnet when energized;
   a low voltage power supply for supplying low voltage power to electronic components;
   a high voltage direct current power supply;
   a timing module in electrical communication with said low voltage power supply, said timing module constructed and arranged to monitor the movement of said crankshaft whereby said timing module generates a light signal in response to said movement, said light signal being transferred to a firing module;
   a firing module in electric communication with said low voltage power supply and said high voltage power supply, said firing module including at least one driver board optically connected to said timing module to receive said light signal from said timing module, said driver board in electrical communication with at least one insulated gate bipolar transistor, said insulated gate bipolar transistor constructed and arranged to control the opening and closing of at least one gate thus connecting and disconnecting said high voltage direct current power supply to said at least one electromagnet assembly in a predetermined manner.

12. The magnetically operated reciprocating engine of claim 11 wherein said at least one insulated gate bipolar transistor includes two switching channels that can be operated ether independently, in tandem or in an alternating pattern.

13. The magnetically operated reciprocating engine of claim 12 wherein said firing system includes at least one flyback diode electrically connected across a positive and a negative connection of said at least one electromagnet.

14. The magnetically operated reciprocating engine of claim 11 wherein said timing module includes at least one photoelectric infrared sensor, said at least one infrared sensor being constructed and arranged to cooperate with a timing disc to provide the rotational position of said crankshaft, said photoelectric sensor generating a steady electrical signal for delivery to a power modulator and pulse controller.

15. The magnetically operated reciprocating engine of claim 14 wherein said timing module includes at least one power modulator and pulse controller in electrical communication with said photoelectric infrared sensor, said power modulator and pulse controller constructed and arranged to convert said steady digital signal received from said photoelectric infrared sensor to a signal that can be manually varied in duty cycle within the signal time frame/duration sent.

16. The magnetically operated reciprocating engine of claim 15, wherein said timing module is constructed and arranged to cause said firing module to connect said high voltage direct current power supply to said at least one electromagnet assembly so that said at least one electromagnet assembly receives a first electrical pulse of a first duration as said piston travels through a first portion of a firing window and said at least one electromagnet assembly receives a second electrical pulse of a second duration as said piston travels through a second portion of said firing window.

17. The magnetically operated reciprocating engine of claim 16, whereby said high voltage direct current power supply is connected to said at least one electromagnet assembly so that said pulses vary in duration throughout said firing window.

18. The magnetically operated reciprocating engine of claim 11 wherein said piston includes a plurality of magnets secured thereto, said magnets arranged to compliment each other to create a magnetic flux larger than each individual magnet.

\* \* \* \* \*